(12) United States Patent
Yuan et al.

(10) Patent No.: US 11,671,883 B2
(45) Date of Patent: Jun. 6, 2023

(54) IAB NODE SWITCHING METHOD, IAB NODE, AND DONOR BASE STATION

(71) Applicant: HUAWEI TECHNOLOGIES CO., LTD., Guangdong (CN)

(72) Inventors: Shitong Yuan, Chengu (CN); Mingzeng Dai, Shenzhen (CN); Yalin Liu, Munich (DE); You Li, Shenzhen (CN); Yuanping Zhu, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 192 days.

(21) Appl. No.: 17/134,874

(22) Filed: Dec. 28, 2020

(65) Prior Publication Data

US 2021/0120469 A1    Apr. 22, 2021

Related U.S. Application Data

(63) Continuation of application No. PCT/CN2019/093472, filed on Jun. 28, 2019.

(30) Foreign Application Priority Data

Jun. 29, 2018   (CN) .......................... 201810712471.3

(51) Int. Cl.
*H04W 36/00* (2009.01)
*H04B 7/06* (2006.01)
(Continued)

(52) U.S. Cl.
CPC ...... *H04W 36/0072* (2013.01); *H04B 7/0626* (2013.01); *H04L 27/2607* (2013.01);
(Continued)

(58) Field of Classification Search
CPC ......... H04W 36/0072; H04W 36/0077; H04W 56/001; H04W 72/005; H04W 72/0426;
(Continued)

(56) References Cited

U.S. PATENT DOCUMENTS 9,232,516 B1   1/2016 Oroskar et al.
10,009,825 B1   6/2018 Marupaduga et al.
(Continued)

FOREIGN PATENT DOCUMENTS

CN   101022387 A   8/2007
CN   101068186 A   11/2007
(Continued)

OTHER PUBLICATIONS

Huawei, HiSilicon, Consideration on IAB physical layer enhancement. 3GPP TSG RAN WG1 Meeting #91, Reno, USA, Nov. 27-Dec. 1, 2017, R1-1720606, 7 pages.
(Continued)

*Primary Examiner* — Brenda H Pham
(74) *Attorney, Agent, or Firm* — Womble Bond Dickinson (US) LLP

(57) ABSTRACT

An IAB node switching method is applied to a relay system, and the relay system includes a donor base station and a first IAB node. The donor base station provides a gateway function for the first IAB node. The first IAB node receives a first BWP configuration from the donor base station, where the first BWP configuration includes a BWP configuration of a second IAB node, and the second IAB node is a candidate upper-level node of the first IAB node. The first IAB node switches to the second IAB node. According to the IAB node switching method, the IAB node, and the donor base station that are provided in this application, service availability of an IAB node is ensured when the IAB node has a plurality of upper-level nodes.

20 Claims, 7 Drawing Sheets

(51) Int. Cl.
*H04L 27/26* (2006.01)
*H04W 56/00* (2009.01)
*H04W 72/0453* (2023.01)
*H04W 74/08* (2009.01)
*H04W 88/14* (2009.01)
*H04W 72/23* (2023.01)
*H04W 72/27* (2023.01)
*H04W 72/30* (2023.01)

(52) U.S. Cl.
CPC ..... *H04W 36/0077* (2013.01); *H04W 56/001* (2013.01); *H04W 72/0453* (2013.01); *H04W 72/23* (2023.01); *H04W 72/27* (2023.01); *H04W 72/30* (2023.01); *H04W 74/0833* (2013.01); *H04W 88/14* (2013.01)

(58) Field of Classification Search
CPC ......... H04W 72/0453; H04W 74/0833; H04W 88/14; H04B 7/0626; H04L 27/2607
See application file for complete search history.

(56) References Cited

U.S. PATENT DOCUMENTS

| 2010/0167743 | A1* | 7/2010 | Palanki | H04B 7/2606 |
| | | | | 455/67.11 |
| 2019/0372887 | A1* | 12/2019 | Majmundar | H04L 47/34 |
| 2021/0258244 | A1* | 8/2021 | Xu | H04L 45/28 |

FOREIGN PATENT DOCUMENTS

| CN | 101877856 A | 11/2010 |
| CN | 102088740 A | 6/2011 |
| CN | 102523612 A | 6/2012 |
| CN | 107483234 A | 12/2017 |
| CN | 107534980 A | 1/2018 |
| CN | 108112080 A | 6/2018 |
| JP | 2010147744 A | 7/2010 |
| WO | 2012096615 A1 | 7/2012 |
| WO | 2018029537 A1 | 2/2018 |

OTHER PUBLICATIONS

CATT, Discussion on Topology adaption. 3GPP TSG-RAN WG3 #NR AdHoc 1807, Montreal, Canada, Jul. 2-6, 2018, R3-183815, 3 pages.
Samsung, Necessary Enhancements for NR IAB. 3GPP TSG RAN WG1 Meeting #94 , Gothenburg, Sweden, Aug. 20, 24, 2018, R1-1808772, 8 pages.
LG Electronics, Discussions on NR IAB support. 3GPP TSG RAN WG1 Meeting #92bis, Sanya, China, Apr. 16-20, 2018, R1-1804583, 9 pages.
LG Electronics,"Discussions on NR IAB support",3GPP TSG RAN WG1 Meeting #93 R1-1806649, Busan, Korea, May 21-25, 2018,Total 12 Pages.
Lenovo et al.,"Backhaul link reselection",3GPP TSG-RAN WG2 Meeting#101bis R2-1805210,Sanya, China, Apr. 16-Apr. 20, 2018,total 4 pages.
Samsung,"Necessary Enhancements for NR IAB",3GPP TSG RAN WG1 Meeting #95 R1-1812981 Spokane, USA, Nov. 12, 16, 2018,Total 9 Pages.
3GPP TS 37.324 V15.0.0 (Jun. 2018);3rd Generation Partnership Project;Technical Specification Group Radio Access Network;E-UTRA and NR;Service Data Adaptation Protocol (SDAP) specification (Release 15),total 13 pages.
ATandT,"Summary of 7.7.1 Enhancements to support NR backhaul links",3GPP TSG RAN WG1 Meeting #92bis R1-1805673, Sanya, China, Apr. 16th, 20th, 2018,Total 13 Pages.
3GPP TS 36.300 V15.1.0 (Mar. 2018);3rd Generation Partnership Project;Technical Specification Group Radio Access Network;Evolved Universal Terrestrial Radio Access (E-UTRA) and Evolved Universal Terrestrial Radio Access Network (E-UTRAN),Overall description; Stage 2(Release 15);total 341 pages.

* cited by examiner

IAB NODE SWITCHING METHOD, IAB NODE, AND DONOR BASE STATION

CROSS-REFERENCE TO RELATED APPLICATIONS

This application is a continuation of International Application No. PCT/CN2019/093472, filed on Jun. 28, 2019, which claims priority to Chinese Patent Application No. 201810712471.3, filed on Jun. 29, 2018. The disclosures of the aforementioned applications are hereby incorporated by reference in their entireties.

TECHNICAL FIELD

This application relates to the communications field, and more specifically, to an integrated access and backhaul (IAB) node switching method, an IAB node, and a donor base station.

BACKGROUND

In a 5G-oriented (5th generation mobile networks or 5th generation wireless systems, 5G) wireless relay networking scenario, multi-hop wireless relay and multi-connection scenarios are supported.

Multi-hop is defined as follows: If data transmitted between user equipment (UE) and a donor gNodeB (DgNB) passes through two relay nodes (RN), there are two hops; if the data passes through three RNs, there are three hops, and so on. In 5G, a relay node is also referred to as an IAB node.

In the multi-hop wireless relay networking scenario, a network topology on a radio access network side may be considered as a tree based topology. Alternatively, there is a clear hierarchical relationship between an RN and a DgNB that serves the relay node. Each relay node considers a node that provides a backhaul service for the relay node as a parent node, and the parent node may also be referred to as an upper-level node of the relay node.

In the multi-hop multi-connection networking scenario, one relay node may be provided with a backhaul service by two or more upper-level nodes (base stations or relay nodes).

When a relay node has a plurality of upper-level nodes, how to ensure service availability of the relay node is a problem that needs to be considered during current IAB standardization.

SUMMARY

This application provides an IAB node switching method, an IAB node, and a donor base station, to help ensure service availability of an IAB node when the IAB node has a plurality of upper-level nodes.

According to a first aspect, this application provides an IAB node switching method. The switching method is applied to a relay system, the relay system includes at least a donor base station and a first IAB node, the donor base station provides a gateway function for the first IAB node, and the method includes:

The first IAB node receives a first bandwidth part (BWP) configuration from the donor base station, where the first BWP configuration includes a BWP configuration of a second IAB node, and the second IAB node is a candidate upper-level node of the first IAB node.

The first IAB node switches to the second IAB node.

In the method, the donor base station sends the first BWP configuration corresponding to the second IAB node to the first IAB node. In this way, the first IAB node may switch to the second IAB node based on the first BWP configuration when necessary, so as to ensure service availability of the first IAB node.

Because the first IAB node may switch to the second IAB node based on the previously received first BWP configuration, a user plane data interruption time in a switching process is reduced.

In an embodiment, that the first IAB node switches to the second IAB node includes:

The first IAB node receives downlink control information (DCI) from a third IAB node, where the downlink control information is used to indicate the first IAB node to switch to the first BWP configuration, and the third IAB node is a current serving node of the first IAB node.

The first IAB node switches to the second IAB node based on the downlink control information.

In other words, in this embodiment, the third IAB node that currently serves the first IAB node triggers the first IAB node to switch to the second IAB node based on the first BWP configuration.

In an embodiment, before the first IAB node switches to the second IAB node, the method further includes:

The first IAB node measures quality of at least one of a reference signal (RS) or a synchronization signal (SS) of the second IAB node.

The first IAB node reports the quality of at least one of the RS or the SS of the second IAB node to the third IAB node.

In other words, the third IAB node that currently serves the first IAB node may indicate, based on signal quality that is of another IAB node and that is measured by the first IAB node, a specific IAB node to which the first IAB node switches, so as to help the first IAB node switch to an IAB node with better signal quality.

In an embodiment, that the first IAB node switches to the second IAB node includes:

The first IAB node switches to the second IAB node when determining that a condition for switching to the first BWP configuration is satisfied.

In other words, the first IAB node may actively switch to the second IAB node based on the first BWP configuration.

In an embodiment, the condition for switching to the second IAB node includes at least one of the following:

a measurement result of an SS of the third IAB node is less than a preset threshold; or a measurement result of a channel state information-reference signal (CSI-RS) of the third IAB node is less than a preset threshold; or a measurement result of a tracking reference signal (TRS) of the third IAB node is less than a preset threshold; or a measurement result of a demodulation reference signal (DMRS) of the third IAB node is less than a preset threshold; or a data volume buffered in the first IAB node is greater than a preset threshold; or the first IAB node detects a beam failure; or a quantity of beam failures detected by the first IAB node in a unit time is greater than a preset threshold; or the first IAB node does not receive a downlink signal from the third IAB node within a preset time.

In an embodiment, the first BWP configuration includes at least one of the following: a BWP identifier, a subcarrier spacing, and random access channel (RACH) information.

According to a second aspect, this application provides an IAB node switching method. The switching method is applied to a relay system, the relay system includes at least a donor base station, a first IAB node, and a second IAB node, the donor base station provides a gateway function for the first IAB node, the second IAB node is a candidate upper-level node of the first IAB node, and the method includes:

The donor base station receives, from the second IAB node, a BWP configuration configured by the second IAB node for the first IAB node, where the second IAB node is a candidate upper-level node of the first IAB node.

The donor base station sends a first BWP configuration to the first IAB node, where the first BWP configuration includes a BWP configuration of the second IAB node.

In the method, the donor base station sends the first BWP configuration to the first IAB node based on the BWP configuration reported by the second IAB node. In this way, the first IAB node may switch to the second IAB node based on the first BWP configuration when necessary.

Because the first IAB node may switch to the second IAB node based on the previously received first BWP configuration, a user plane data interruption time in a switching process is reduced, so as to ensure service availability of the first IAB node.

In an embodiment, the method further includes:

The donor base station receives first information from a third IAB node, where the first information is used to indicate the first IAB node to switch to the second IAB node, and the third IAB node is a serving node of the first IAB node. The donor base station sends second information to the second IAB node, where the second information is used to indicate the second IAB node to use the first BWP configuration to communicate with the first IAB node.

In an embodiment, the first BWP configuration includes at least one of the following: a BWP identifier, a subcarrier spacing, and random access channel RACH information.

According to a third aspect, this application provides an IAB node switching method. The switching method includes:

A first IAB node measures a BWP of an upper-level node based on a BWP configuration.

The first IAB node determines to switch to a second IAB node corresponding to a target BWP, where the target BWP is a BWP satisfying quality of service of the first IAB node, and the second IAB node is a candidate upper-level node of the first IAB node.

The first IAB node switches to the second IAB node.

In the method, the first IAB node may actively start a BWP configuration switching procedure, so as to help improve communication reliability.

In an embodiment, the switching method further includes:

The first IAB node sends a BWP measurement report to a third IAB node, where the third IAB node is a serving node of the first IAB node before switching.

In an embodiment, the method further includes:

The first IAB node receives downlink control information from the third IAB node, where the downlink control information is used to indicate the first IAB node to switch to the second IAB node.

In other words, after the first IAB node starts a switching procedure, the third IAB node that currently serves the first IAB node indicates the first IAB node to perform switching.

In an embodiment, that the first IAB node determines to switch to a second IAB node corresponding to a target BWP includes:

The first IAB node determines that a BWP switching condition is satisfied, and switches to the second IAB node corresponding to the target BWP.

In an embodiment, the switching method further includes:

The first IAB node sends a node switching indication message to a third IAB node, where the node switching indication message is used to indicate the first IAB node to switch to the second IAB node, and the third IAB node is a serving node of the first IAB node before switching.

In an embodiment, that the first IAB node sends a node switching indication message to a third IAB node includes:

The first IAB node sends the node switching indication message to the third IAB node through the second IAB node.

In an embodiment, when quality of communication between the first IAB node and the third IAB node is relatively poor or the first IAB node cannot communicate with the third IAB node, the second IAB node forwards a BWP switching indication message to the third IAB node, so as to help ensure that the third IAB node can receive the BWP switching indication message, thereby improving communication reliability.

In an embodiment, the BWP switching condition includes at least one of the following:

a measurement result of an SS of the third IAB node is less than a preset threshold; or a measurement result of a CSI-RS of the third IAB node is less than a preset threshold; or a measurement result of a TRS of the third IAB node is less than a preset threshold; or a measurement result of a DMRS of the third IAB node is less than a preset threshold; or a data volume buffered in the first IAB node is greater than a preset threshold; or the first IAB node detects a beam failure; or a quantity of beam failures detected by the first IAB node in a unit time is greater than a preset threshold; or the first IAB node does not receive a downlink signal from the third IAB node within a preset time.

According to a fourth aspect, an IAB node is provided. The IAB node includes a module configured to perform the switching method in any one of the first aspect or the embodiments of the first aspect.

According to a fifth aspect, a donor base station is provided. The donor base station includes a module configured to perform the switching method in any one of the second aspect or the embodiments of the second aspect.

According to a sixth aspect, an IAB node is provided. The IAB node includes a module configured to perform the switching method in any one of the third aspect or the embodiments of the third aspect.

According to a seventh aspect, an IAB node is provided. The IAB node includes a processor and a receiver. The processor is configured to execute a program. When the processor executes the program, the processor and the receiver implement the switching method in any one of the first aspect or the embodiments of the first aspect.

In an embodiment, the IAB node may further include a memory. The memory is configured to store the program executed by the processor.

In an embodiment, the IAB node may further include a transmitter. The transmitter is configured to send information to another device or apparatus.

According to an eighth aspect, a donor base station is provided. The donor base station includes a processor, a receiver, and a transmitter. The processor is configured to execute a program. When the processor executes the program, the processor, the receiver, and the transmitter implement the switching method in any one of the second aspect or the embodiments of the second aspect.

In an embodiment, the donor base station may further include a memory. The memory is configured to store the program executed by the processor.

According to a ninth aspect, an IAB node is provided. The IAB node includes a processor. The processor is configured to execute a program. When the processor executes the program, the processor implements the switching method in any one of the third aspect or the embodiments of the third aspect.

In an embodiment, the IAB node may further include a memory. The memory is configured to store the program executed by the processor.

In an embodiment, the IAB node may further include a transmitter. The transmitter is configured to send information to another device or apparatus.

In an embodiment, the IAB node may further include a receiver. The receiver is configured to receive information sent by another device or apparatus.

According to a tenth aspect, a computer readable storage medium is provided. The computer readable storage medium stores program code to be executed by an IAB node, and the program code includes an instruction used to implement the switching method in any one of the first aspect or the embodiments of the first aspect.

According to an eleventh aspect, a computer readable storage medium is provided. The computer readable storage medium stores program code to be executed by a donor base station, and the program code includes an instruction used to implement the switching method in any one of the second aspect or the embodiments of the second aspect.

According to a twelfth aspect, a computer readable storage medium is provided. The computer readable storage medium stores program code to be executed by an IAB node, and the program code includes an instruction used to implement the switching method in any one of the third aspect or the embodiments of the third aspect.

According to a thirteenth aspect, an embodiment of this application provides a computer program product including an instruction. When the computer program product is run on a computer, the computer is enabled to perform the switching method in the first aspect.

According to a fourteenth aspect, an embodiment of this application provides a computer program product including an instruction. When the computer program product is run on a computer, the computer is enabled to perform the switching method in the second aspect.

According to a fifteenth aspect, an embodiment of this application provides a computer program product including an instruction. When the computer program product is run on a computer, the computer is enabled to perform the switching method in the third aspect.

According to a sixteenth aspect, a chip is provided. The chip includes a processor and a communications interface. The communications interface is configured to communicate with an external device. The processor is configured to implement the switching method in any one of the first aspect or the embodiments of the first aspect.

In an embodiment, the chip may further include a memory. The memory stores an instruction. The processor is configured to execute the instruction stored in the memory. When the instruction is executed, the processor is configured to implement the switching method in any one of the first aspect or the embodiments of the first aspect.

In an embodiment, the chip may be integrated into an IAB node.

According to a seventeenth aspect, a chip is provided. The chip includes a processor and a communications interface. The communications interface is configured to communicate with an external device. The processor is configured to implement the switching method in any one of the second aspect or the embodiments of the second aspect.

In an embodiment, the chip may further include a memory. The memory stores an instruction. The processor is configured to execute the instruction stored in the memory. When the instruction is executed, the processor is configured to implement the switching method in any one of the second aspect or the embodiments of the second aspect.

In an embodiment, the chip may be integrated into a donor base station.

According to an eighteenth aspect, a chip is provided. The chip includes a processor and a communications interface. The communications interface is configured to communicate with an external device. The processor is configured to implement the switching method in any one of the third aspect or the embodiments of the third aspect.

In an embodiment, the chip may further include a memory. The memory stores an instruction. The processor is configured to execute the instruction stored in the memory. When the instruction is executed, the processor is configured to implement the switching method in any one of the first aspect or the embodiments of the first aspect.

In an embodiment, the chip may be integrated into an IAB node.

DESCRIPTION OF EMBODIMENTS

The following describes technical solutions in this application with reference to accompanying drawings.

Figure 1:
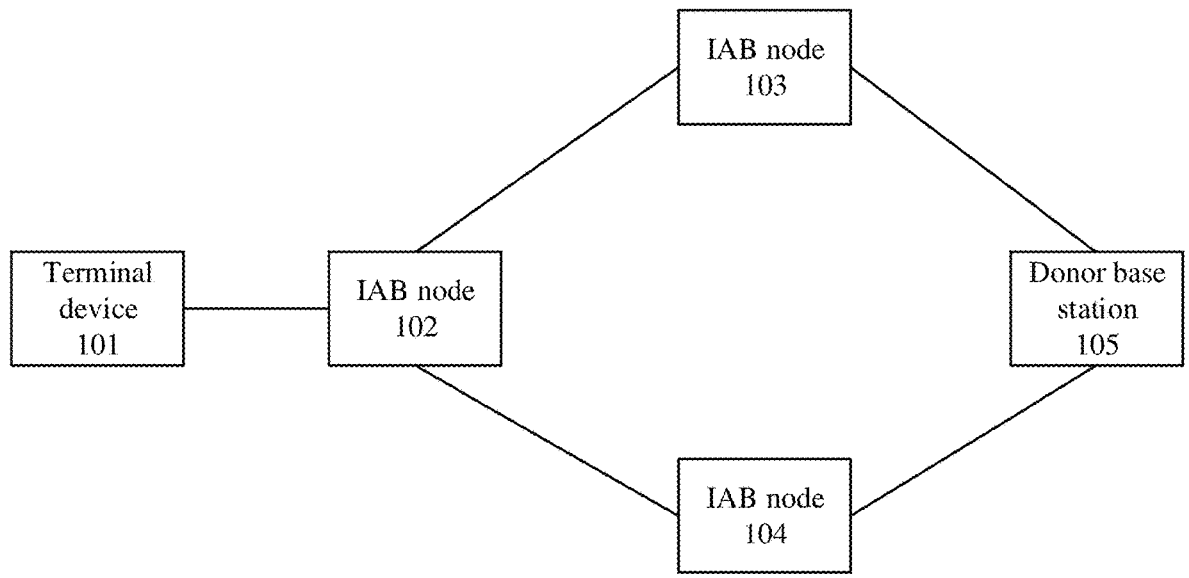
FIG. 1 is a schematic diagram of an application scenario of a method and an apparatus according to an embodiment of this application.

As shown in FIG. 1, a communications system that can perform the embodiments of this application may include a terminal device 101, an IAB node 102, an IAB node 103, an IAB node 104, and a donor base station 105.

The technical solutions in the embodiments of this application may be applied to various communications systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5G communications system, and a 5G new radio (NR) communications system.

In the embodiments of this application, the donor base station may be a device configured to communicate with a mobile station, and may be specifically any one of the following: an access point (AP) in a wireless local area network (WLAN), a base transceiver station (BTS) in a global system for mobile communications (GSM) or code division multiple access (CDMA), a NodeB (NB) in wideband code division multiple access (WCDMA), an evolved NodeB (eNB) in an LTE system, a relay station or an access point, a vehicle-mounted device, a wearable device, an access network device in a future 5G network, an access network device in a future evolved public land mobile network (PLMN), and the like.

The terminal device may also be referred to as UE, a mobile station, an access terminal, a subscriber unit, a subscriber station, a mobile station, a remote station, a remote terminal, a mobile device, a terminal, a wireless communications device, a user agent, a user apparatus, or the like, and may be specifically any one of the following: a station (ST) in a WLAN, a cellular phone, a cordless phone, a session initiation protocol (SIP) phone, a wireless local loop (WLL) station, a personal digital assistant (PDA), a handheld device with a wireless communication function, a computing device, another processing device connected to a wireless modem, a vehicle-mounted device, a wearable device, a mobile station in a future 5G network, a terminal device in a future evolved PLMN, and the like.

A communication connection may be established between the terminal device 101 and the IAB node 102. A communication connection may be established between the IAB node 102 and the IAB node 103. A communication connection may be established between the donor base station 105 and any one of the IAB node 103 and the IAB node 104 or both. The donor base station 105 provides a gateway function for each of the IAB node 103 and the IAB node 104. The gateway function includes a data forwarding or routing function provided for the IAB node, or an inter-IAB node interworking interface function provided for the IAB node, for example, an S1, X1, X2, or Xn interface function, or an upper-layer protocol function provided for the IAB node, for example, packet data convergence protocol (PDCP) and radio resource control (RRC) functions. A communication connection may be established between the IAB node 102 and the IAB node 104, for example, through an S1 interface, an X1 interface, an X2 interface, or an Xn interface.

A link between the donor base station 105 and each of the IAB node 103 and the IAB node 104 may be a backhaul (BH) link, and a link between the terminal device 101 and the IAB node 102 may be an access (AC) link.

For ease of description, meanings of terms in this application are defined as follows:

Uplink transmission: A device transmits data or a signal to a network. The device includes a terminal device, an IAB node, or the like.

Downlink transmission: A device receives data or a signal transmitted by a network. Similarly, the device includes a terminal, an IAB node, or the like.

Upper-level node: The upper-level node is a node that receives data or a signal during uplink transmission, or a node that sends data or a signal during downlink transmission. For example, the IAB node 102 is an upper-level node of the terminal device 101, the IAB node 103 is an upper-level node of the IAB node 102, and so on.

Lower-level node: The lower-level node is a node that sends data or a signal during uplink transmission, or a node that receives data or a signal during downlink transmission. For example, the IAB node 102 is a lower-level node of the IAB node 103.

Serving node: The serving node is a node that provides a data transmission service for a lower-level node or a terminal device, and may be an IAB node or a donor node.

Candidate upper-level node: The candidate upper-level node is an upper-level node that can provide a backhaul link resource for an IAB node, but is not a serving node of the IAB node currently. An IAB node can have one or more candidate upper-level nodes.

Active BWP: The active BWP is a BWP used by a node that is currently providing a service for a first IAB node to communicate with the first IAB node.

When the terminal device 101 transmits uplink data to the donor base station 105, in an embodiment, the terminal device 101 may transmit the data to the donor base station 105 sequentially through the IAB node 102 and the IAB node 103. The IAB node 102 is an upper-level node (that is, a parent node) of the terminal device 101, the IAB node 103 is an upper-level node of the IAB node 102, and the donor base station 105 is an upper-level node of the IAB node 103.

When the terminal device 101 transmits uplink data to the donor base station 105, in another embodiment, the terminal device 101 may transmit the data to the donor base station 105 sequentially through the IAB node 102 and the IAB node 104. The IAB node 102 is an upper-level node of the terminal device 101, the IAB node 104 is an upper-level node of the IAB node 102, and the donor base station 105 is an upper-level node of the IAB node 104.

Further, the donor base station 105 may send data to a user plane function (UPF), a serving gateway (SGW) device, or a public data network gateway (PGW) device in the 5G network.

When the donor base station 105 transmits data to the terminal device 101, in an embodiment, the donor base station 105 may transmit the data to the terminal device 101 sequentially through the IAB node 103 and the IAB node 102. The donor base station is an upper-level node of the IAB node 103, the IAB node 103 is an upper-level node of the IAB node 102, and the IAB node 102 is an upper-level node of the terminal device 101.

When the donor base station 105 transmits data to the terminal device 101, in another embodiment, the donor base station 105 may transmit the data to the terminal device 101 sequentially through the IAB node 104 and the IAB node 101. The donor base station 105 is an upper-level node of the IAB node 104, the IAB node 104 is an upper-level node of the IAB node 102, and the IAB node 102 is an upper-level node of the terminal device 101.

In other words, when the terminal device 101 transmits data to the donor base station 105, a possible path is that the terminal device 101 transmits data to the donor base station 105 through the IAB node 102 and the IAB node 103, that is, the IAB node 103 provides a service for the IAB node 102; and another possible path is that the terminal device 101 transmits data to the donor base station 105 through the IAB node 102 and the IAB node 104, that is, the IAB node 104 provides a service for the node IAB node 102.

Currently, when the terminal device 101 transmits data to the donor base station 105 through the IAB node 102 and the IAB node 103, the terminal device 101 may switch to another path which transmits the data to the donor base station 105 through the IAB node 102 and the IAB node 104 instead of the IAB node 102 and the IAB node 103 due to a plurality of reasons. Alternatively, currently, when the terminal device 101 transmits data to the donor base station 105 through the IAB node 102 and the IAB node 104, the terminal device 101 may switch to another path which transmits the data to the donor base station 105 sequentially through the IAB node 102 and the IAB node 103 instead of the IAB node 102 and the IAB node 104. Link reasons include: Signal quality of an original backhaul link cannot meet a preset quality requirement, the link is interrupted, a capacity of the original link is insufficient, or the like.

Switching a path for transmitting data between the terminal device 101 and the donor base station 105 may be understood as switching an IAB node that serves the IAB node 102 from the IAB node 103 to the IAB node 104, that is, to an IAB node that provides a service to the IAB node 102. Further, switching a path for transmitting data between the terminal device 101 and the donor base station 105 may be understood as switching a backhaul link used by the IAB node 102 to transmit data.

Normally, different IAB nodes may work on different bandwidth parts (BWPs). The IAB node 102 needs to perform node switching, that is, change an upper-level node, based on a BWP configuration of each upper-level node. The information about the BWP of each upper-level node may be preconfigured for the IAB node 102. In this application, configured a BWP configuration of an upper-level node is referred to as a BWP configuration. The BWP is a part of a bandwidth of a carrier. For example, for a carrier with a bandwidth of 100 MHz, 20 MHz thereof is designated as a BWP. The information about the BWP includes a BWP identifier (ID), a subcarrier spacing, a cyclic prefix (CP) indication, a bandwidth value, a frequency domain position of a start resource block (for example, a number of the start resource block, a number of a subcarrier, a position of a frequency channel number, or a number measured in a unit bandwidth), random access channel RACH information (used for BWP access), synchronization signal/physical broadcast channel (SS/PBCH) configuration information, and a CSI-RS configuration. The CSI-RS and SS/PBCH configurations include a time-frequency resource configuration.

This application proposes a new method and apparatus for switching a BWP configuration of an IAB node.

As described above, in a multi-hop multi-connection scenario, a relay node may have a plurality of upper-level nodes, and may switch between the plurality of upper-level nodes, so as to avoid a problem that data cannot be routed because link quality cannot meet a quality of service requirement or a link is interrupted.

Because different upper-level nodes may provide backhaul services for a relay node by using different bandwidth parts, when backhaul link switching is performed, a case in which different upper-level nodes use different BWP configurations needs to be considered. How to ensure that a relay node uses correct BWP information when performing upper-level node switching to implement fast upper-level node switching is a technical problem that needs to be resolved.

To resolve the foregoing problem, the embodiments provide an integrated access and backhaul IAB node switching method. The method is applied to a relay system, the relay system includes at least a donor base station and a first IAB node, and the donor base station provides a gateway function for the first IAB node. The method includes: The first IAB node receives a first bandwidth part BWP configuration from the donor base station, where the first BWP configuration includes a BWP configuration of a second IAB node, and the second IAB node is a candidate upper-level node of the first IAB node. The first IAB node switches to the second IAB node.

In an embodiment, that the first IAB node switches to the second IAB node may include: The first IAB node receives downlink control information from a third IAB node, where the downlink control information is used to indicate the first IAB node to switch to the first BWP configuration, and the third IAB node is a current serving node of the first IAB node. The first IAB node switches to the second IAB node based on the downlink control information.

In an embodiment, that the first IAB node switches to the second IAB node may include: The first IAB node switches to the second IAB node when determining that a condition for switching to the second IAB node is satisfied.

The condition for switching to the second IAB node may include: A measurement result of an SS of the third IAB node is less than a preset threshold; or a measurement result of a CSI-RS of the third IAB node is less than a preset threshold; or a measurement result of a TRS of the third IAB node is less than a preset threshold; or a DMRS measurement result of the third IAB node is less than a preset threshold; or data volume buffered in the first IAB node is greater than a preset threshold; or the first IAB node detects a beam failure; or a quantity of beam failures detected by the first IAB node in a unit time is greater than a preset threshold; or the first IAB node does not receive a downlink signal from the third IAB node within a preset time.

Figure 2:
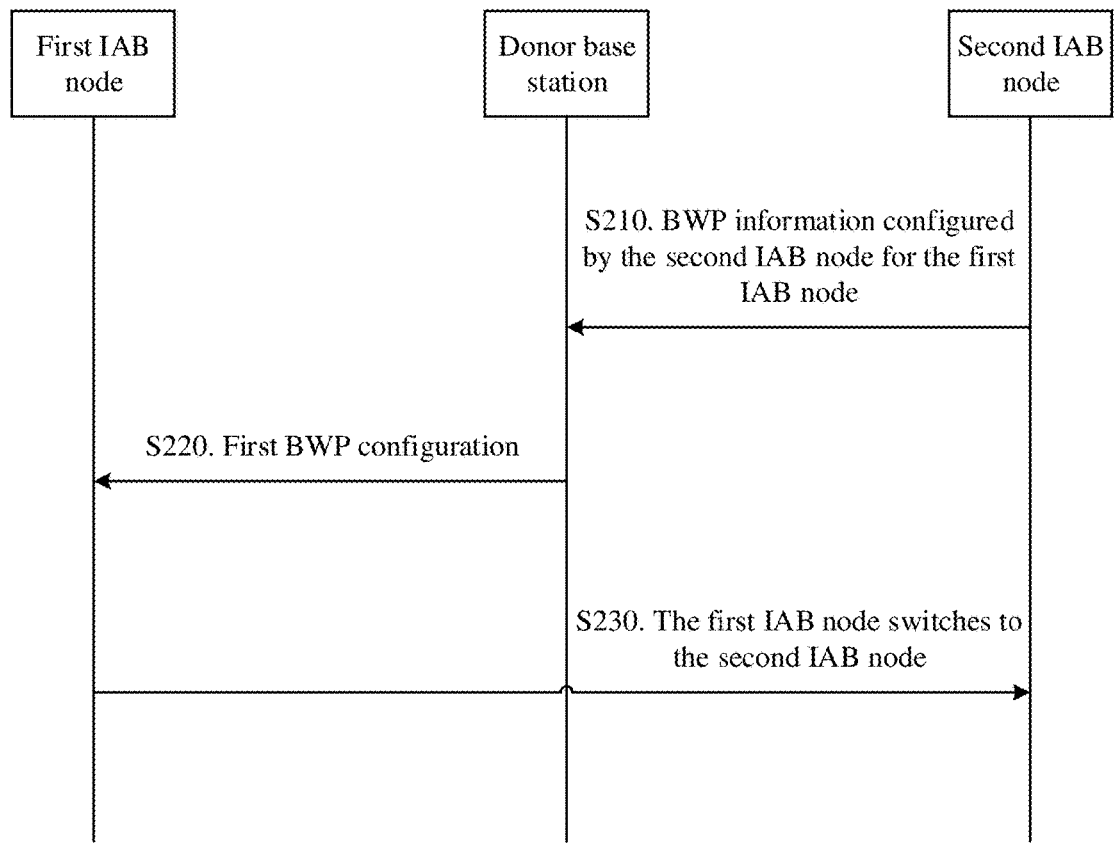
FIG. 2 is a schematic flowchart of a method according to an embodiment of this application.

FIG. 2 is a schematic flowchart of a method for switching a BWP configuration of an IAB node according to an embodiment of this application.

S210. A donor base station receives, from a second IAB node, a BWP configuration configured by the second IAB node for a first IAB node, where the second IAB node is a candidate upper-level node of the first IAB node.

A service range of a candidate upper-level node of the first IAB node can cover the first IAB node. To be specific, the first IAB node can monitor a signal of the candidate upper-level node, and a time in which quality of the detected signal is higher than a sum of a preset threshold and an offset value is longer than a time configured in a time to trigger (TTT). When communication between the first IAB node and an upper-level node that currently serves the first IAB node, that is, a serving node, is affected, the first IAB node may switch to the candidate upper-level node, and communicate with the donor base station through the candidate upper-level node.

In a relay system, because wireless backhaul is used between an IAB node and an upper-level node, IAB nodes may not directly communicate with each other. Because an interface between IAB nodes is an X2 interface or an enhanced X2 interface, the IAB node may communicate with the donor base station through an upper-level node, and send a BWP configuration currently used by the IAB node to the donor base station. The BWP configuration includes BWP information, and BWP configurations of IAB nodes may be different. Therefore, the donor base station may obtain neighbor information of the IAB nodes, and determine routes of the IAB nodes based on the neighbor information, that is, the donor base station may determine a set of candidate upper-level nodes of the IAB nodes.

If the first IAB node has a plurality of candidate upper-level nodes, the donor base station may receive, from a plurality of second IAB nodes, a BWP configuration configured by each second IAB node for the first IAB node, that is, the donor base station may configure a set of the candidate upper-level nodes for the first IAB node. In this application, a set of upper-level nodes is referred to as a first BWP configuration.

S220. The donor base station sends a first BWP configuration to the first IAB node, where the first BWP configuration includes a BWP configuration of the second IAB node. Correspondingly, the first IAB node receives the first BWP configuration from the donor base station.

The donor base station may obtain the first BWP configuration based on the BWP configuration received from the second IAB node.

The first BWP configuration may include at least one of indication information of uplink BWP or indication information of downlink BWP. The indication information of uplink BWP is used to indicate that a BWP of a candidate upper-level node is used to transmit uplink data, and the indication information of downlink BWP is used to indicate that a BWP of a candidate upper-level node is used to transmit downlink data.

The first BWP configuration may include one or more of the following information: a BWP configuration ID, a subcarrier spacing, a CP indication, a bandwidth value, a frequency domain position of a start resource block, SS/PBCH configuration information, CSI-RS configuration information, RACH information, and PUSCH configuration information.

In an embodiment, the first IAB node may measure quality of at least one of an RS or an SS of the second IAB node, that is, the first IAB node can measure quality of at least one of an RS or an SS of a candidate upper-level node, and then send radio resource control (RRC) signaling including the measurement result to the donor base station through a serving node of the first IAB node. Then, the donor base station sends the measurement result of the first IAB node to the second IAB node, and the second IAB node generates, based on the received measurement result, a BWP configuration used when the second IAB node serves the first IAB node. Next, the donor base station delivers, to the first IAB node through the first BWP configuration, the information about the BWP that is generated by the second IAB node, so that the information is used when the first IAB node switches a BWP configuration. It should be understood that there may be a plurality of second nodes. To be specific, the first node may measure signals (at least one of SSs or RSs) of the plurality of second IAB nodes, and the donor base station may configure information about BWPs of one or more second IAB nodes for the first IAB node in the first BWP configuration. There may be one or more pieces of BWP information of each second IAB node.

The communications system shown in FIG. 1 is used as an example. If an IAB node that currently provides a service for the IAB node 102 is the IAB node 103, that is, a parent node of the IAB node 102 is the IAB node 103 and the IAB node is also within coverage of the IAB node 104, the IAB node 102 may measure quality of at least one of an RS or an SS of the IAB node 104. Then, the IAB node 102 sends RRC signaling including the measurement result to the donor base station 105 through the IAB node 103, to report the measurement result to the donor base station 105. After receiving the measurement result, the donor base station 105 may send the measurement result to the IAB node 104. The IAB node 104 generates, based on the measurement result, a BWP configuration that can be used when the IAB node 102 switches to the IAB node 104. The IAB node 104 reports the BWP configuration to the donor base station 105. The donor base station 105 sends the RRC signaling including the BWP configuration to the IAB node 102 through the IAB node 103.

In an embodiment, the donor base station 105 may send the BWP configuration to the IAB node 102 in another manner. This is not limited in this embodiment of this application.

The measurement result reported by the IAB node 102 may include beam information. For example, it is assumed that the IAB node 104 has a total of 64 beams that are separately directed to different directions to complete 360-degree coverage. Because the IAB node 104 cannot transmit such a large quantity of beams at the same time, the IAB node 104 can scan only one circle in time. The IAB node 102 detects beams with relatively good communication quality, and then reports information about these beams.

The IAB node 104 may determine, based on the measurement result, a direction in which quality of communication between a beam and the IAB node 102 is good, and then configure a period in which the IAB node 102 needs to receive a PDCCH. The BWP configuration generated by the IAB node 104 may include a configuration generated based on the measurement result.

S230. The first IAB node switches to the second IAB node.

That the first IAB node switches to the second IAB node may be understood as that the first IAB node communicates with the second IAB node based on the first BWP configuration. For example, the first IAB node communicates with the second IAB node based on the PUSCH configuration information related to the second IAB node in the first BWP configuration through a PUSCH of the second IAB node.

The communications system shown in FIG. 1 is used as an example. That the IAB node 102 switches from the IAB node 103 to the IAB node 104 means that the IAB node 102 communicates with the IAB node 104 through the first BWP configuration.

In the method, the donor base station sends the first BWP configuration to the first IAB node. In this way, the first IAB node may switch to the first BWP configuration, that is, to the second IAB node when necessary.

Because the first IAB node may switch to the second IAB node based on the previously received first BWP configuration, a user plane data interruption time in a switching process is reduced.

Figure 3:
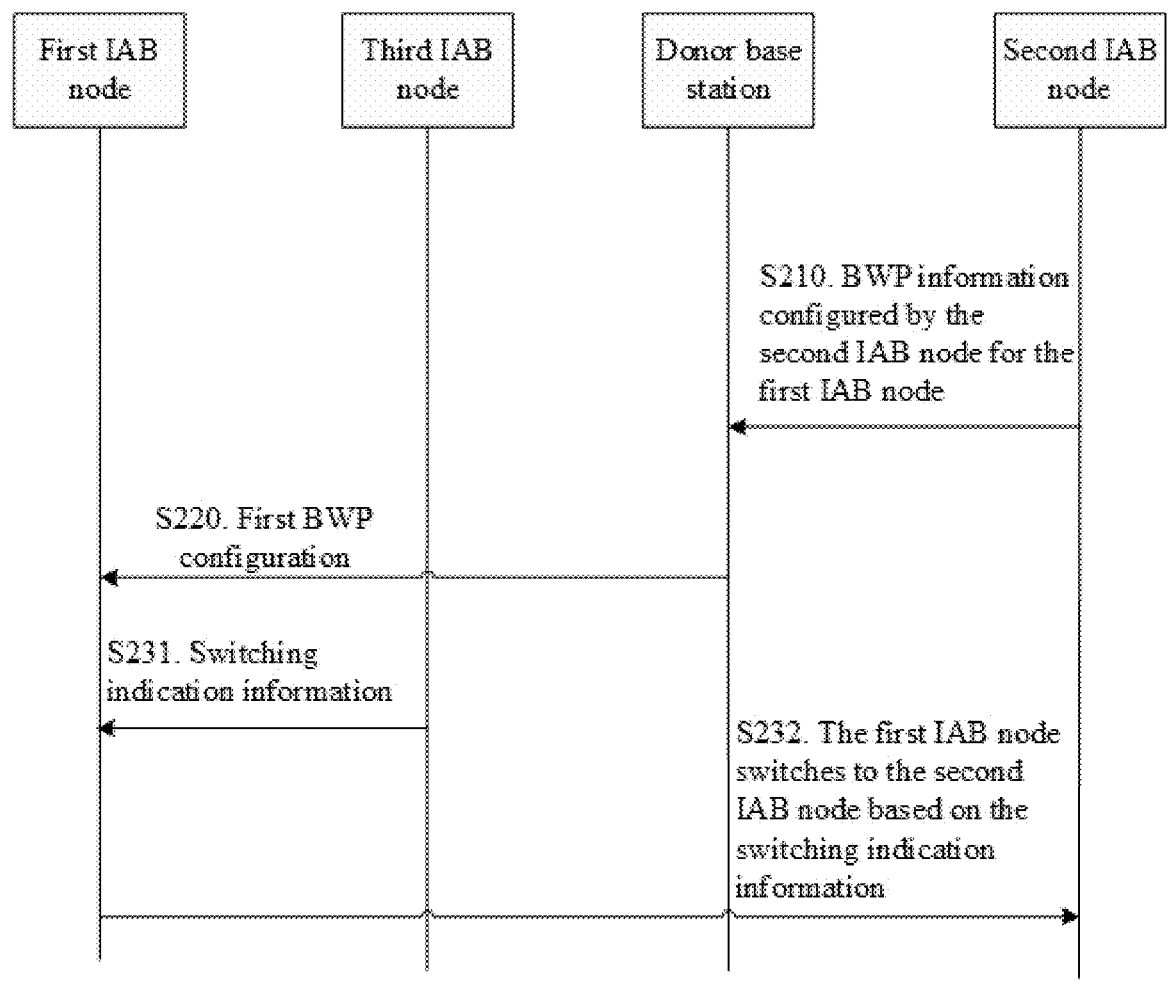
FIG. 3 is a schematic flowchart of a method according to another embodiment of this application.

In this embodiment of this application, the first IAB node may switch to the second IAB node according to an indication of a third IAB node, and the third IAB node is a serving node of the first IAB node. For example, as shown in FIG. 3, S230 may include S231 and S232. To be specific, the first IAB node receives a switching indication from the third IAB node, and switches to the second IAB node according to the indication. In an embodiment, the switching indication of the third IAB node includes the information about the BWP of the second IAB node. After receiving the indication, the first IAB node switches to the BWP that corresponds to the second IAB node and that is indicated by the third IAB node.

In an embodiment, the switching indication of the third IAB node includes only information for indicating the first IAB node to perform switching. In this case, the first IAB node needs to select, from the BWP configuration configured by the donor base station, a BWP of the second IAB node for switching.

Figure 4:
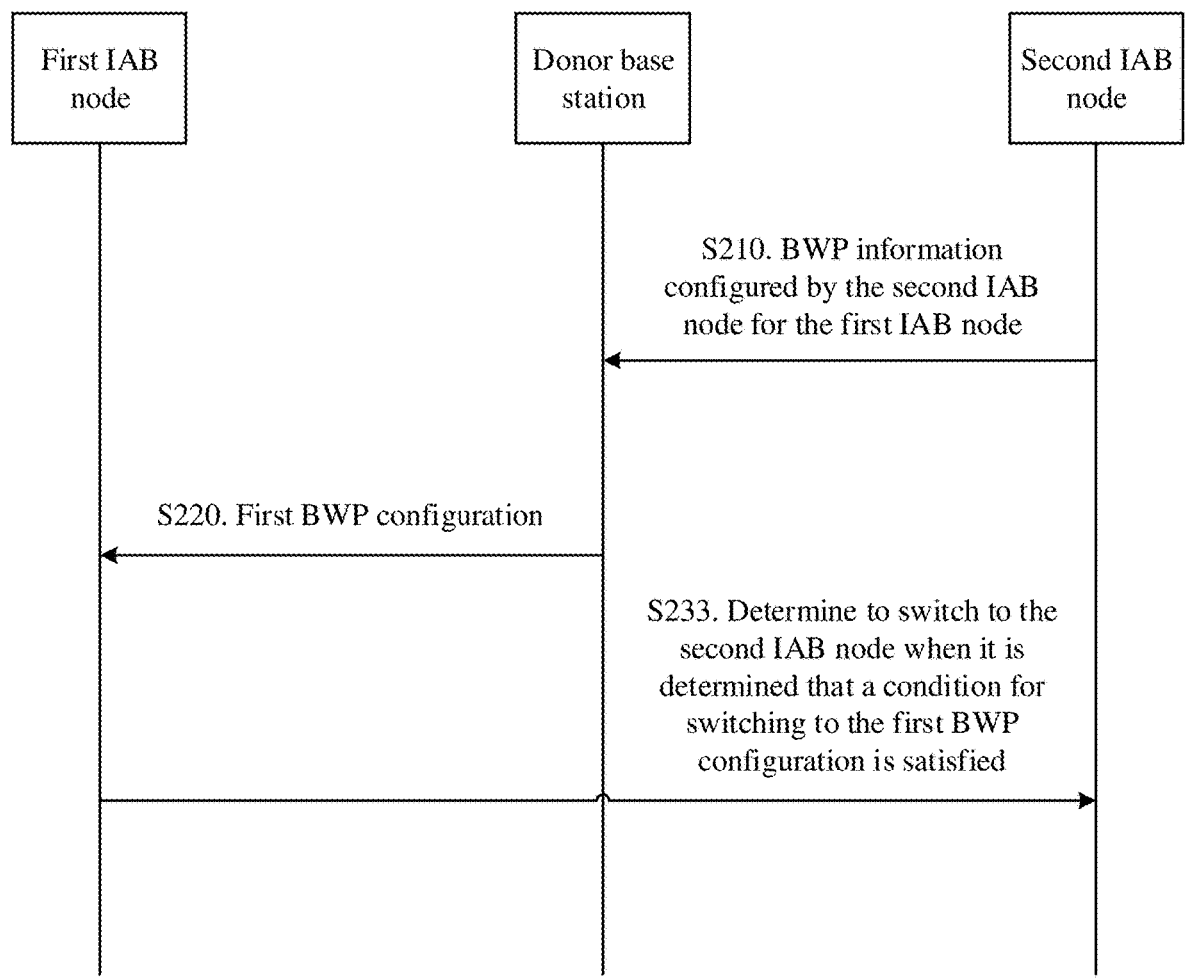
FIG. 4 is a schematic flowchart of a method according to another embodiment of this application.

In an embodiment, the first IAB node may alternatively actively switch to the second IAB node. For example, as shown in FIG. 4, S230 may include S233.

With reference to FIG. 3, the following describes an embodiment in which the first IAB node switches to the second IAB node.

S231. The third IAB node sends switching indication information to the first IAB node, where the switching indication information is used to indicate the first IAB node to switch to the second IAB node. Correspondingly, the first IAB node receives the switching indication information from the third IAB node. The switching indication information may be transmitted through an RRC message or a MAC CE.

For example, when the third IAB node does not receive a scheduling feedback from the first IAB node, the third IAB node may send the switching indication information to the first IAB node to indicate the first IAB node to switch to the second IAB node.

An example of the switching indication information is downlink control information (DCI). For example, two bitmaps may be used in the DCI to indicate the second IAB node to which the first IAB node switches. In this case, the two bitmaps correspond to 0, 1, 2, and 3, which may indicate IDs of four BWPs in total, that is, four IAB nodes.

The communications system shown in FIG. 1 is used as an example. When determining that measured quality of a BH link between the IAB node 103 and the IAB node 102 is less than a threshold, or that a current transmission bandwidth is limited, that is, a transmission bandwidth requirement of the IAB node 102 cannot be satisfied, the IAB node 103 may send switching indication information to the IAB node 102 to indicate the IAB node 102 to switch to the IAB node 104.

S232. The first IAB node switches to the second IAB node based on the switching indication information.

After receiving the switching indication information from the third IAB node, the first IAB node may communicate with the second IAB node based on the first BWP configuration under an indication of the switching indication information.

The communications system shown in FIG. 1 is used as an example. After receiving the DCI from the IAB node 103, the IAB node 102 switches to the IAB node 104 according to an indication of the DCI.

In the method shown in FIG. 3, in an embodiment, when the third IAB node sends the switching indication information to the first IAB node to indicate the first IAB node to switch to the second IAB node, the third IAB node may further send indication information (which may be referred to as second information for ease of description) to the second IAB node to indicate that the second IAB node can communicate with the first IAB node through the BWP corresponding to the second IAB node. It should be understood that the first BWP configuration includes the second IAB node and the information about the BWP corresponding to the second IAB node, that is, there is a correspondence between the second IAB node and the information about the BWP. If the information about the BWP in the first BWP configuration includes at least one of indication information of uplink BWP or indication information of downlink BWP, uplink or downlink transmission is performed on a corresponding BWP based on at least one of the indication information of uplink BWP or the indication information of downlink BWP. It should be understood that at least one of the indication information of uplink BWP or the indication information of downlink BWP in the first BWP configuration is/are specific to a BWP. One second node may configure one or more BWPs, and at least one of indication information of uplink BWP or indication information of downlink BWP are/is configured for each BWP. If the switching indication information sent by the third IAB node indicates a second IAB node, and the first BWP configuration includes a plurality of pieces of BWP information of the second IAB node, the first IAB node selects target BWP information from the plurality of pieces of BWP information, and communicates with the second IAB based on the BWP information. In a TDD scenario, one BWP may be used for both uplink transmission and downlink transmission. BWP information such as a subcarrier spacing and a CP configuration of one IAB node may be different.

In an embodiment, after sending the switching indication information to the first node, the third IAB node sends indication information (which may be referred to as first information for ease of description) to the donor base station to notify the donor base station that the first IAB node has switched to the second IAB node. After receiving the first information, the donor base station sends the second information to the second IAB node. The second information is used to indicate the second IAB node to use the first BWP configuration to communicate with the first IAB node. After receiving the second information sent by the donor base station, the second IAB node schedules the first IAB node on a specified BWP, or receives uplink information from the first IAB node. It should be understood that, after receiving the switching indication information from the third IAB node, the first IAB node may initiate a data transmission process or an access process on the BWP of the second IAB node based on the first BWP configuration, and the second IAB node does not need to be configured by the donor base station to schedule the first IAB node.

In an embodiment, if the third IAB node may directly communicate with the second IAB node, before the third IAB node sends the switching indication to the first IAB node, the third IAB node sends the indication information to the second IAB node. The indication information is used by the second IAB node to receive uplink transmission of the first IAB node on the BWP of the second node in the first BWP configuration, or to schedule the first IAB node on the BWP of the second node in the first BWP configuration.

With reference to FIG. 4, the following describes another embodiment in which the first IAB node switches to the second IAB node.

S233. The first IAB node switches to the second IAB node when determining that a condition for switching to the first BWP configuration is satisfied.

The condition in which the first IAB switches to the second IAB node may include at least one of the following:
a measurement result of an SS of the third IAB node is less than a preset threshold; or
a measurement result of a CSI-RS of the third IAB node is less than a preset threshold; or
a measurement result of a TRS of the third IAB node is less than a preset threshold; or
a measurement result of a DMRS of the third IAB node is less than a preset threshold; or
data volume buffered in the first IAB node is greater than a preset threshold; or
the first IAB node detects a beam failure; or
a quantity of beam failures detected by the first IAB node in a unit time is greater than a preset threshold; or
the first IAB node does not receive a downlink signal from the third IAB node within a preset time.

The TRS may also be referred to as a phase tracking reference signal (PTRS).

The first BWP configuration may include information about a default BWP of the first IAB node. The default BWP is a BWP to which the first IAB node switches by default when a BWP of a current serving node is unavailable. It should be understood that the default BWP corresponds to a second node, that is, the default BWP belongs to the second IAB node. The default BWP may be a configured BWP, or may be a BWP with a best measurement result that is selected by the first IAB node after the first IAB node measures the second IAB node. Determining of the default BWP is not limited in this application.

The data volume buffered in the first IAB node may be a data volume buffered in one radio link control (RLC) entity in the first IAB node, or may be a sum of data volume buffered in all RLC entities, or may be a sum of data volume buffered in some RLC entities, or may be an data volume indicated by a higher layer to a media access control (MAC) layer, or may be an amount of data calculated by a packet data convergence protocol (PDCP) layer or an amount of data calculated by an adaptation layer. This is not limited in this solution.

That the first IAB node switches to the first BWP configuration if the first IAB node does not receive a downlink signal from the third IAB node within a preset time may include: The first IAB node starts a timer after the first IAB node does not receive a physical downlink control channel (PDCCH) on a current active BWP, and the first IAB node switches to the first BWP configuration if the first IAB node does not receive the PDCCH after the timer expires; or the timer is reset and timing restarts if the first IAB node receives a new PDCCH for the first IAB node before the timer expires. Alternatively, the first IAB node does not receive, within a preset time, a CSI-RS sent by the third IAB node. Alternatively, the first IAB node does not receive, within a preset time, an SS/PBCH sent by the third IAB node. Alternatively, the first IAB node does not receive, within a preset time, a TRS sent by the third IAB node. Alternatively, the first IAB node does not receive, within a preset time, a DMRS sent by the third IAB node.

In this embodiment of this application, as described above, the first BWP configuration sent by the donor base station to the first IAB node includes the correspondence between the second IAB node and the BWP. Correspondingly, the first IAB node receives, from the donor base station, the correspondence between the second IAB node and the BWP that is included in the first BWP configuration. Information included in the BWP is described above, and the second IAB node may include a plurality of BWPs. Details are not described again.

In an embodiment, the correspondence between the second IAB node and the BWP may alternatively be that an identifier of the second IAB node is obtained through the BWP. For example, each BWP identifier corresponds to one second IAB node identifier, and the BWP identifier is further associated with information about the BWP. For example, a BWP ID is 1, an ID of the associated second IAB node is 1, the information about the BWP may include: a subcarrier spacing corresponding to the BWP ID equals to 1 is 15 KHz, a normal CP, RACH resource configuration etc. Details are not elaborated herein. The information about the BWP is not limited in this application.

In the method shown in FIG. 2, after receiving the correspondence between the first BWP configuration and the second IAB node, the first IAB node buffers the correspondence. In addition, routing information of the first IAB node may be updated after the first IAB node switches to the second IAB node, so that the first IAB node can communicate with the second IAB node based on updated routing information.

The correspondence between the first BWP configuration and the second IAB node may be a correspondence between an identifier (ID) of the first BWP configuration and an ID of the second IAB node.

The communications system shown in FIG. 1 is used as an example. The donor base station 105 may send a correspondence between an ID of the first BWP configuration and an ID of the IAB node 104 to the IAB node 102. The first BWP configuration includes a BWP configuration that is generated by the IAB node 104 and that is used for communication between the IAB node 102 and the IAB node 104.

This application further proposes another IAB node switching method. The switching method includes: A first IAB node measures at least one of an RS or an SS of an upper-level node based on a BWP configuration. The first IAB node determines to switch to a second IAB node corresponding to a target BWP, where the target BWP is a BWP satisfying quality of service of the first IAB node, and the second IAB node is a candidate upper-level node of the first IAB node. The first IAB node switches to the second IAB node.

In an embodiment, the switching method further includes: The first IAB node sends a BWP measurement report to a third IAB node, where the third IAB node is a serving node of the first IAB node before switching.

In an embodiment, the switching method further includes: The first IAB node receives switching indication information from the third IAB node, where the switching indication information is used to indicate the first IAB node to switch the second IAB node.

In an embodiment, that the first IAB node determines to switch to a second IAB node corresponding to a target BWP includes: The first IAB node determines that a BWP switching condition is satisfied, and switches to the second IAB node corresponding to the target BWP.

In an embodiment, the switching method further includes: The first IAB node sends a node switching indication message to a third IAB node, where the node switching indication message is used to indicate the first IAB node to switch to the second IAB node, and the third IAB node is a node that serves the first IAB node before switching.

In an embodiment, that the first IAB node sends a node switching indication message to a third IAB node includes: The first IAB node sends the node switching indication message to the third IAB node through second IAB node.

In an embodiment, the BWP switching condition includes at least one of the following:

a measurement result of an SS of the third IAB node is less than a preset threshold; or a measurement result of a CSI-RS of the third IAB node is less than a preset threshold; or a measurement result of a TRS of the third IAB node is less than a preset threshold; or a measurement result of a DMRS of the third IAB node is less than a preset threshold; or data volume buffered in the first IAB node is greater than a preset threshold; or the first IAB node detects a beam failure; or a quantity of beam failures detected by the first IAB node in a unit time is greater than a preset threshold; or the first IAB node does not receive a downlink signal from the third IAB node within a preset time.

Figure 5:
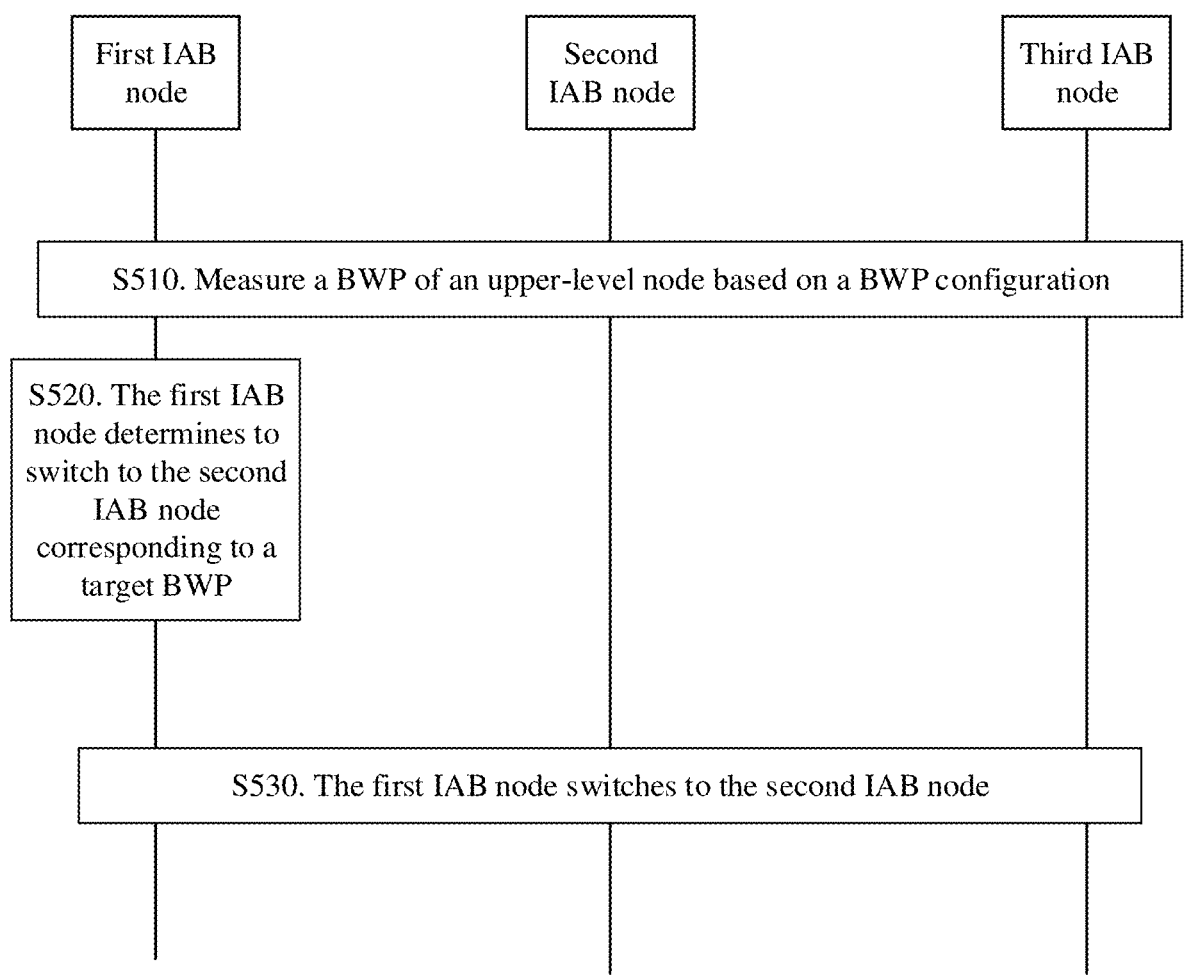
FIG. 5 is a schematic flowchart of a method according to another embodiment of this application.

FIG. 5 is a schematic flowchart of a method according to another embodiment of this application. The method shown in FIG. 5 may include S510, S520, and S530.

S510. A first IAB node measures a BWP of an upper-level node based on a first BWP configuration.

The first IAB node measures the BWP of the upper-level node based on the BWP configuration stored in the first IAB node, and determines a target BWP from the BWP configuration.

Specifically, the first IAB node measures all configured BWPs based on BWP information in the first BWP configuration. Usually, an SS/PBCH or a CSI-RS of each BWP is measured. For specific measurement, refer to an existing measurement method. Details are not described again. It should be specially noted that BWP measurement herein is not limited to measurement on a signal within a bandwidth range of the BWP, and may be measurement on an entire carrier. Therefore, BWP measurement may also be measurement on an entire carrier bandwidth. A measurement method is not limited in this application.

There may be a plurality of methods for determining the target BWP. For example, a BWP with best channel quality may be determined as the target BWP, that is, a BWP with a best measurement result is used as the target BWP, or a BWP of an upper-level node with a largest quantity of BWPs may be used as the target BWP. As described above, one upper-level node may configure a plurality of BWPs to provide services for the first IAB node. In this case, a quantity of BWPs may also be used as one of parameters for determining the target BWP. It should be understood that channel quality of a BWP first needs to satisfy a specific requirement, that is, a channel measurement result cannot be less than a threshold. A specific BWP determining method is not limited in this application.

S520. The first IAB node determines to switch to a second IAB node corresponding to the target BWP, where the target BWP is a BWP satisfying quality of service of the first IAB node, and the second IAB node is a candidate upper-level node of the first IAB node.

Before determining to switch to the target BWP, the first node first needs to determine whether a serving node satisfies a quality requirement, and if the serving node cannot satisfy the quality requirement, the first IAB node needs to determine whether to switch to the second IAB node corresponding to the target BWP.

That the first IAB node determines to switch to a second IAB node corresponding to the target BWP may include: The first IAB node determines that a BWP switching condition is satisfied, and switches to the second IAB node corresponding to the target BWP.

The BWP switching condition may include one or more of the following: a measurement result of an SS of a third IAB node is less than a preset threshold; or a measurement result of a CSI-RS of a third IAB node is less than a preset first threshold; or a measurement result of a TRS of a third IAB node is less than a preset first threshold; or a measurement result of a DMRS of a third IAB node is less than a preset first threshold; or data volume buffered in the first IAB node is greater than a preset second threshold; or the first IAB node detects a beam failure; or a quantity of beam failures detected by the first IAB node in a unit time is greater than a preset third threshold; or the first IAB node does not receive a downlink signal from a third IAB node within a preset time.

When the first IAB node determines that the BWP switching condition is satisfied, the first IAB node may send a node switching indication message to the third IAB node. The third IAB node is a node that serves the first IAB node before the first IAB node switches to the second IAB node, and the node switching indication message is used to indicate the first IAB node to switch to the second IAB node.

S530. The first IAB node switches to the second IAB node.

For this operation, refer to S230. Details are not described herein again.

In an embodiment, a default BWP configuration may be configured on the first IAB node, that is, a BWP to which the first IAB node switches by default when an exception occurs on communication performed by the first IAB node through a current active BWP configuration. The default BWP may be a BWP used when the second IAB node communicates with the first IAB node, and an IAB node corresponding to the default BWP is the second IAB node.

In an embodiment, the first IAB node may send the measurement result to the third IAB node. The third IAB node is a serving node of the first IAB node before switching, and the third IAB node determines, based on the measurement result, that the first IAB can switch to the second IAB node.

After determining that the first IAB node can switch to the second IAB node, the third IAB node may send switching indication information to the first IAB node to indicate the first IAB node to switch to the second IAB node. For this operation, refer to S231. An operation similar to 232 may be performed subsequently, and details are not described herein again.

The communications system shown in FIG. 1 is used as an example. The IAB node 102 sends a node switching indication message to the IAB node 103.

The first IAB node may send a BWP switching indication message to the second IAB node through an RACH resource in the BWP configuration. In an embodiment, the switching indication message may be sent through a grant-free resource on the target BWP, or a scheduling request (SR) resource or an uplink semi-persistent scheduling (SPS) resource. The grant-free resource means that data can be sent without scheduling by the second IAB node, and the grant-free resource is usually configured. For example, information about the grant-free resource may be added to the BWP information in the first BWP configuration. Data is transmitted on the grant-free resource, and a random access procedure does not need to be first completed. The RACH resource, the grant-free resource, the SR resource, or the SPS resource may include a resource configuration in BWP information in the BWP configuration corresponding to the second IAB node, or may be a preconfigured RACH resource, grant-free resource, SR resource, or SPS resource.

The node switching indication message may carry identification information of the second IAB node or identification information of a BWP configuration corresponding to the second IAB node.

The node switching indication message may further include information such as a reason for triggering IAB node switching.

In the method, the first IAB node may actively trigger an IAB node switching procedure, to reduce a data delay and an interruption time in a switching process, thereby helping improve communication reliability.

In an embodiment, the first IAB node may directly send the node switching indication message to the third IAB node.

That the first IAB node directly sends the node switching indication message to the third IAB node herein may be understood as that the first IAB node sends the node switching indication message to the third IAB node without through another IAB node.

In an embodiment, after receiving the node switching indication message, the third IAB node may directly send a switching acknowledgement message to the first IAB node to indicate the first IAB node to switch to the second IAB node.

That the third IAB node directly sends the switching acknowledgement message to the first IAB node herein may be understood as that the third IAB node sends the switching acknowledgement message to the first IAB node without through another IAB node.

The communications system shown in FIG. 1 is used as an example. When one or more of the following conditions are satisfied: a measurement result of a synchronization signal SS of the IAB node 103 is less than a preset threshold, a measurement result of a CSI-RS of the IAB node 103 is less than a preset threshold, a measurement result of a TRS of the IAB node 103 is less than a preset threshold, a measurement result of a DMRS of the IAB node 103 is less than a preset threshold, and a data volume buffered in the IAB node 102 is greater than a preset threshold, the IAB node 102 may directly send a node switching indication message to the IAB node 103. After receiving the node switching indication message, the IAB node 103 may directly send a switching acknowledgement message to the IAB node 102.

In an embodiment, the first IAB node may send the node switching indication message to the third IAB node through the second IAB node. For example, the first IAB node sends the node switching indication message to the second IAB node, and then the second IAB node sends the node switching indication message to the third IAB node.

For example, when one or more of the following conditions are satisfied: the first IAB node detects a beam failure, a quantity of beam failures detected by the first IAB node in a unit time is greater than a preset threshold, and the first IAB node does not receive a downlink signal from the third IAB node within a preset time, the first IAB node sends the node switching indication message to the second IAB node.

In an embodiment, after receiving the node switching indication message from the first IAB node through the second IAB node, the third IAB node may send the switching acknowledgement message to the first IAB node through the second IAB node.

The communications system in FIG. 1 is used as an example. The IAB node 102 sends the node switching indication message to the IAB node 104, and the IAB node 104 sends the node switching indication message to the IAB node 103. After receiving the node switching indication message, the IAB node 103 sends the switching acknowledgement message to the IAB node 104, and the IAB node 104 sends the switching acknowledgement message to the IAB node 102.

In the method shown in FIG. 5, after sending the switching acknowledgement message, the third IAB node may send, to the second IAB node, a number of a data packet that is currently successfully sent to the first IAB node, so that the second IAB node can send the data packet to the first IAB node according to the number.

Figure 6:
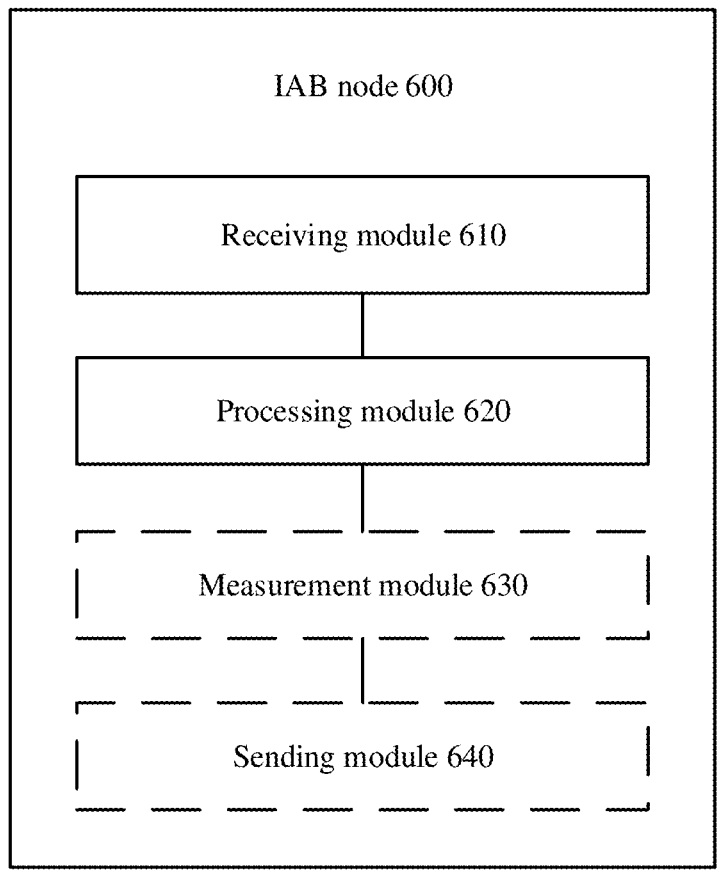
FIG. 6 is a schematic structural diagram of an IAB node according to an embodiment of this application.

FIG. 6 is a schematic block diagram of an IAB node 600 according to an embodiment of this application. It should be understood that the IAB node shown in FIG. 6 is merely an example. The IAB node in this embodiment of this application may further include another module or unit, or a module with a function similar to that of each module in FIG. 6, or may not necessarily include all modules in FIG. 6.

The IAB node 600 is applied to a relay system, the relay system includes at least a donor base station and the IAB node 600, the donor base station provides a gateway function for the IAB node 600, and the IAB node 600 includes:

a receiving module 610, configured to receive a first bandwidth part BWP configuration from the donor base station, where the first BWP configuration includes a BWP configuration of a second IAB node, and the second IAB node is a candidate upper-level node of the IAB node; and a processing module 620, configured to switch to the second IAB node.

In an embodiment, the receiving module is further configured to receive downlink control information from a third IAB node, where the downlink control information is used to indicate the IAB node to switch to the first BWP configuration, and the third IAB node is a current serving node of the IAB node.

The processing module is specifically configured to switch to the second IAB node based on the downlink control information.

In an embodiment, the IAB node further includes a measurement module 630 and a sending module 640.

The measurement module is configured to measure quality of at least one of an RS or an SS of the second IAB node before the processing module switches to the second IAB node.

The sending module is configured to report the quality of at least one of the reference signal or the synchronization signal of the second IAB node to the third IAB node.

In an embodiment, the processing module is specifically configured to switch to the second IAB node when determining that a condition for switching to the second IAB node is satisfied.

In an embodiment, the condition for switching to the second IAB node includes:

a measurement result of an SS of the third IAB node is less than a preset threshold; or a measurement result of a CSI-RS of the third IAB node is less than a preset threshold; or a measurement result of a TRS of the third IAB node is less than a preset threshold; or a measurement result of a DMRS of the third IAB node is less than a preset threshold; or data volume buffered in the first IAB node is greater than a preset threshold; or the first IAB node detects a beam failure; or a quantity of beam failures detected by the first IAB node in a unit time is greater than a preset threshold; or the first IAB node does not receive a downlink signal from the third IAB node within a preset time.

In an embodiment, the first BWP configuration includes at least one of the following: a BWP identifier, a subcarrier spacing, indication information of CP, a bandwidth value, a frequency domain position of a start resource block, SS/PBCH configuration information, CSI-RS configuration information, and RACH information.

The IAB node 600 may be configured to perform the operations performed by the first IAB node in the methods described in FIG. 2 to FIG. 4. For brevity, details are not described herein again.

Figure 7:
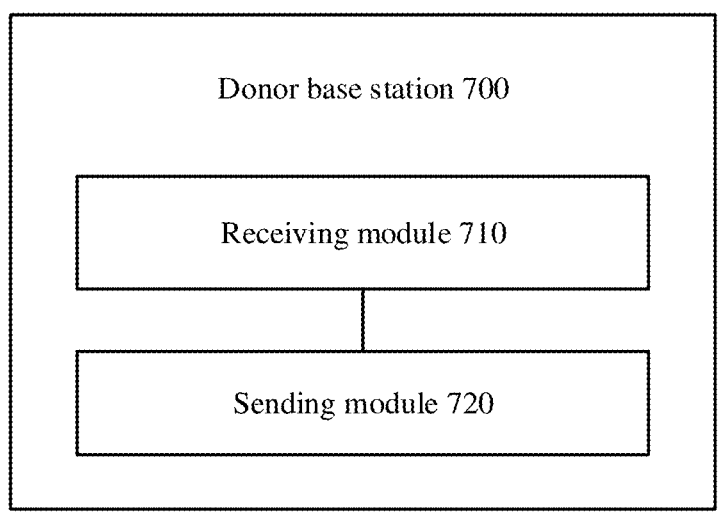
FIG. 7 is a schematic structural diagram of a donor base station according to an embodiment of this application.

FIG. 7 is a schematic block diagram of a donor base station 700 according to an embodiment of this application. It should be understood that the donor base station shown in FIG. 7 is merely an example. The donor base station in this embodiment of this application may further include another module or unit, or a module with a function similar to that of each module in FIG. 7, or may not necessarily include all modules in FIG. 7.

The donor base station 700 is applied to a relay system, the relay system includes at least the donor base station 700, a first IAB node, and a second IAB node, the donor base station 700 provides a gateway function for the first IAB node, the second IAB node is a candidate upper-level node of the first IAB node, and the donor base station 700 includes:

a receiving module 710, configured to receive, from the second IAB node, information about a bandwidth part BWP configured by the second IAB node for the first IAB node, where the second IAB node is a candidate upper-level node of the first IAB node; and a sending module 720, configured to send a first BWP configuration to the first IAB node, where the first BWP configuration includes a BWP configuration of the second IAB node.

In an embodiment, the receiving module is further configured to:

receive first information from a third IAB node, where the first information is used to indicate the first IAB node to switch to the second IAB node, and the third IAB node is a serving node of the first IAB node.

The sending module is further configured to send second information to the second IAB node, where the second information is used to indicate the second IAB node to use the first BWP configuration to communicate with the first IAB node.

In an embodiment, the first BWP configuration includes at least one of the following: a BWP identifier, a subcarrier spacing, a CP indication, a bandwidth value, a frequency domain position of a start resource block, SS/PBCH configuration information, CSI-RS configuration information, and random access channel RACH information.

The donor base station 700 may be configured to perform the operations performed by the donor base station in the methods described in FIG. 2 to FIG. 4. For brevity, details are not described herein again.

Figure 8:
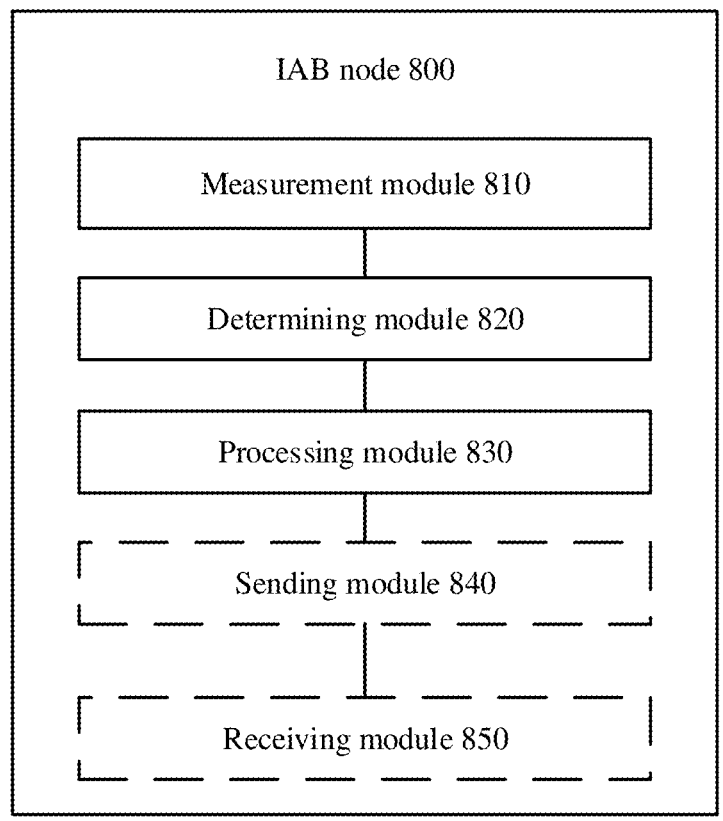
FIG. 8 is a schematic structural diagram of an IAB node according to another embodiment of this application.

FIG. 8 is a schematic block diagram of an IAB node 800 according to an embodiment of this application. It should be understood that the IAB node shown in FIG. 8 is merely an example. The IAB node in this embodiment of this application may further include another module or unit, or a module with a function similar to that of each module in FIG. 8, or may not necessarily include all modules in FIG. 8.

The IAB node includes: a measurement module 810, configured to measure a BWP of an upper-level node based on a bandwidth part BWP configuration;

a determining module 820, configured to determine to switch to a second IAB node corresponding to a target BWP, where the target BWP is a BWP satisfying quality of service of the IAB node, and the second IAB node is a candidate upper-level node of the IAB node; and a processing module 830, configured to switch to the second IAB node.

In an embodiment, the IAB node further includes a sending module 840, configured to send a BWP measurement report to a third IAB node, where the third IAB node is a serving node of the IAB node before switching.

In an embodiment, the IAB node further includes a receiving module 850, configured to:

receive downlink control information from the third IAB node, where the downlink control information is used to indicate the IAB node to switch to the second IAB node.

In an embodiment, the determining module is further configured to determine that a BWP switching condition is satisfied.

The processing module is specifically configured to switch to the second IAB node corresponding to the target BWP.

In an embodiment, the sending module 840 is further configured to send a node switching indication message to a third IAB node, where the node switching indication message is used to indicate the IAB node to switch to the second IAB node, and the third IAB node is a serving node of the IAB node before switching.

In an embodiment, the sending module is specifically configured to send the node switching indication message to the third IAB node through the second IAB node.

In an embodiment, the BWP switching condition includes at least one of the following:

a measurement result of a synchronization signal SS of the third IAB node is less than a preset threshold; or a measurement result of a channel state information-reference signal CSI-RS of the third IAB node is less than a preset first threshold; or a measurement result of a tracking reference signal TRS of the third IAB node is less than a preset first threshold; or a measurement result of a demodulation reference signal DMRS of the third IAB node is less than a preset first threshold; or data volume buffered in the first IAB node is greater than a preset second threshold; or the first IAB node detects a beam failure; or a quantity of beam failures detected by the first IAB node in a unit time is greater than a preset third threshold; or the first IAB node does not receive a downlink signal from the third IAB node within a preset time.

The IAB node 800 may be configured to perform the operations performed by the first IAB node in the method described in FIG. 5. For brevity, details are not described herein again.

Figure 9:
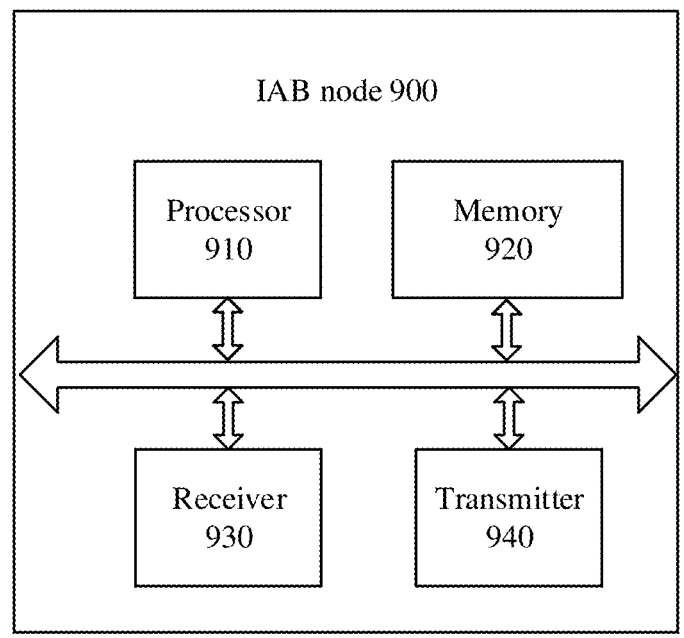
FIG. 9 is a schematic structural diagram of an IAB node according to another embodiment of this application.

FIG. 9 is a schematic structural diagram of an IAB node according to another embodiment of this application. It should be understood that the IAB node 900 shown in FIG. 9 is merely an example. The IAB node in this embodiment of this application may further include another module or unit, or a module with a function similar to that of each module in FIG. 9.

The IAB node 900 may include one or more processors 910, one or more memories 920, a receiver 930, and a transmitter 940. The receiver 930 and the transmitter 940 may be integrated together to obtain a transceiver. The memory 920 is configured to store program code executed by the processor 910. The processor 910 may be integrated with the memory 920, or the processor 910 is coupled to the one or more memories 920, and is configured to invoke an instruction in the memory 920.

In an embodiment, the processor 910 may be configured to implement operations that can be implemented by the processing module 620 and the measurement module 630 in FIG. 6, the transmitter 940 may be configured to implement an operation that can be implemented by the sending module 640 in FIG. 6, and the receiver 930 may be configured to implement an operation that can be implemented by the receiving module 610 in FIG. 6.

Figure 10:
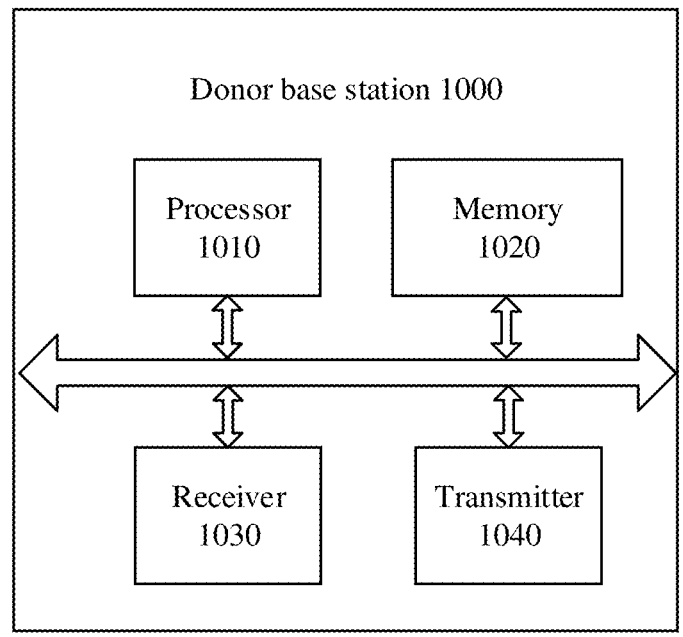
FIG. 10 is a schematic structural diagram of a donor base station according to another embodiment of this application.

FIG. 10 is a schematic structural diagram of a donor base station according to another embodiment of this application. It should be understood that the donor base station 1000 shown in FIG. 10 is merely an example. The donor base station in this embodiment of this application may further include another module or unit, or a module with a function similar to that of each module in FIG. 10.

The donor base station 1000 may include one or more processors 1010, one or more memories 1020, a receiver 1030, and a transmitter 1040. The receiver 1030 and the transmitter 1040 may be integrated together to obtain a transceiver. The memory 1020 is configured to store program code executed by the processor 1010. The processor 1010 may be integrated with the memory 1020, or the processor 1010 is coupled to the one or more memories 1020, and is configured to invoke an instruction in the memory 1020.

In an embodiment, the transmitter 1040 may be configured to implement an operation that can be implemented by the sending module 720 in FIG. 7, and the receiver 1030 may be configured to implement an operation that can be implemented by the receiving module 710 in FIG. 7.

Figure 11:
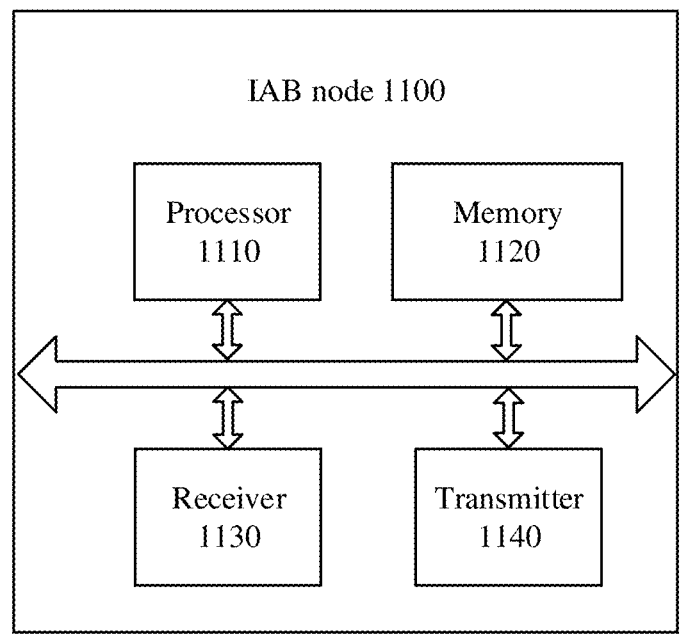
FIG. 11 is a schematic structural diagram of an IAB node according to another embodiment of this application.

FIG. 11 is a schematic structural diagram of an IAB node according to another embodiment of this application. It should be understood that the IAB node 1100 shown in FIG. 11 is merely an example. The IAB node in this embodiment of this application may further include another module or unit, or a module with a function similar to that of each module in FIG. 11.

The IAB node 1100 may include one or more processors 1110, one or more memories 1120, a receiver 1130, and a transmitter 1140. The receiver 1130 and the transmitter 1140 may be integrated together to obtain a transceiver. The memory 1120 is configured to store program code executed by the processor 1110. The processor 1110 may be integrated with the memory 1120, or the processor 1110 is coupled to the one or more memories 1120, and is configured to invoke an instruction in the memory 1120.

In an embodiment, the processor 1110 may be configured to implement operations that can be implemented by the measurement module 810, the determining module 820, and the processing module 830 in FIG. 8, the transmitter 1140 may be configured to implement an operation that can be implemented by the sending module 840 in FIG. 8, and the receiver 1130 may be configured to implement an operation that can be implemented by the receiving module 850 in FIG. 8.

A person of ordinary skill in the art may be aware that, in combination with the examples described in the embodiments disclosed in this specification, units and algorithm operations may be implemented by electronic hardware or a combination of computer software and electronic hardware, and the units and algorithms in the foregoing examples may be further implemented in a chip, the chip may perform a function of one of the foregoing units, or may be a combination of a plurality of units, or may perform functions of all units. Whether the functions are performed by hardware or software depends on particular applications and design constraints of the technical solutions. A person skilled in the art may use different methods to implement the described functions for each particular application, but it should not be considered that the embodiment goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in other manners. For example, the described apparatus embodiments are merely examples. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

It should be understood that, the processor in the embodiments of this application may be a central processing unit (CPU). The processor may alternatively be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

When the functions are implemented in a form of a software function unit and sold or used as an independent product, the functions may be stored in a computer readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the operations of the methods described in the embodiments of this application. The storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A switching method comprising:
   receiving, by a first integrated access and backhaul (IAB) node, a first bandwidth part (BWP) configuration from a donor base station of a relay system, the donor base station providing a gateway function for the first IAB node, wherein the first BWP configuration comprises a BWP configuration of a second IAB node, and the second IAB node is a candidate upper-level node of the first IAB node;
   receiving, by the first IAB node, downlink control information from a third IAB node, wherein the downlink control information is used to indicate the first IAB node to switch to the first BWP configuration; and switching, by the first IAB node, to the second IAB node in response to receiving the downlink control information.

2. The switching method according to claim 1, wherein the third IAB node is a current serving node of the first IAB node.

3. The switching method according to claim 2, wherein before switching to the second IAB node, the method further comprises:

measuring, by the first IAB node, a quality of at least one of a reference signal RS or a synchronization signal (SS) of the second IAB node; and reporting, by the first IAB node, the quality of at least one of the reference signal or the synchronization signal of the second IAB node to the third IAB node.

4. The switching method according to claim 1, wherein switching to the second IAB node comprises:

switching, by the first IAB node, to the second IAB node when determining that a condition for switching to the second IAB node is satisfied.

5. The switching method according to claim 4, wherein the condition for switching to the second IAB node comprises at least one of:

a measurement result of a synchronization signal (SS) of the third IAB node is less than a preset threshold;

a measurement result of a channel state information-reference signal (CSI-RS) of the third IAB node is less than a preset threshold;

a measurement result of a tracking reference signal (TRS) of the third IAB node is less than a preset threshold;

a measurement result of a demodulation reference signal (DMRS) of the third IAB node is less than a preset threshold;

data volume buffered in the first IAB node is greater than a preset threshold;

the first IAB node detects a beam failure;

a quantity of beam failures detected by the first IAB node in a unit time is greater than a preset threshold; or the first IAB node does not receive a downlink signal from the third IAB node within a preset time.

6. The switching method according to claim 1, wherein the first BWP configuration comprises at least one of the following: a BWP identifier, a subcarrier spacing, a cyclic prefix (CP) indication, a bandwidth value, a frequency domain position of a start resource block, synchronization signal (SS)/physical broadcast channel (PBCH) configuration information, CSI-RS configuration information, or random access channel (RACH) information.

7. The switching method according to claim 1, further comprising:

reducing a user plane data interruption time responsive to the first IAB node using the first BWP configuration to switch to the second IAB node.

8. An integrated access and backhaul IAB node switching method comprising:

receiving, by a donor base station of a relay system from a second integrated access and backhaul (IAB) node, information about a bandwidth part (BWP) configured by the second IAB node for a first IAB node, wherein the donor base station provides a gateway function for the first IAB node, and the second IAB node is a candidate upper-level node of the first IAB node;

receiving, by the donor base station, first information from a third IAB node, wherein the first information is used to indicate the first IAB node to switch to the second IAB node;

sending, by the donor base station, a first BWP configuration to the first IAB node, wherein the first BWP configuration comprises a BWP configuration of the second IAB node; and sending, by the donor base station, second information to the second IAB node to indicate the second IAB node to use the first BWP configuration to communicate with the first IAB node.

9. The switching method according to claim 8, wherein the third IAB node is a serving node of the first IAB node.

10. The switching method according to claim 8, wherein the first BWP configuration comprises at least one of the following: a BWP identifier, a subcarrier spacing, a cyclic prefix (CP) indication, a bandwidth value, a frequency domain position of a start resource block, synchronization signal (SS)/physical broadcast channel (PBCH) configuration information, CST-RS configuration information, or random access channel (RACH) information.

11. The switching method according to claim 9, wherein, prior to the first IAB node switching to the second IAB node from the third IAB node, the method further comprises:

measuring, by the first IAB node, a quality of at least one of a reference signal RS or a synchronization signal (SS) of the second IAB node; and reporting, by the first IAB node, the quality of at least one of the reference signal or the synchronization signal of the second IAB node to the third IAB node.

12. The switching method according to claim 11, wherein switching to the second IAB node comprises:

switching, by the first IAB node, to the second IAB node when determining that a condition for switching to the second IAB node is satisfied.

13. The switching method according to claim 12, wherein the condition for switching to the second IAB node comprises at least one of:

a measurement result of a synchronization signal (SS) of the third IAB node is less than a preset threshold;

a measurement result of a channel state information-reference signal (CSI-RS) of the third IAB node is less than a preset threshold;

a measurement result of a tracking reference signal (TRS) of the third IAB node is less than a preset threshold;

a measurement result of a demodulation reference signal (DMRS) of the third IAB node is less than a preset threshold;

data volume buffered in the first IAB node is greater than a preset threshold;

the first IAB node detects a beam failure;

a quantity of beam failures detected by the first IAB node in a unit time is greater than a preset threshold; or the first IAB node does not receive a downlink signal from the third IAB node within a preset time.

14. The switching method according to claim 12, further comprising:

reducing a user plane data interruption time responsive to the first IAB node using the first BWP configuration to switch to the second IAB node.

15. An integrated access and backhaul/IAB) node, comprising:

a receiver configured to:

receive a first bandwidth part (BWP) configuration from a donor base station, wherein the first BWP configuration comprises a BWP configuration of a second integrated access and backhaul (IAB) node, and the second IAB node is a candidate upper-level node of the IAB node; and receive downlink control information from a third IAB node, wherein the downlink control information is used to indicate the IAB node to switch to the first BWP configuration; and a processor configured to switch to the second IAB node in response to receiving the downlink control information.

16. The IAB node according to claim 15, wherein the third IAB node is a current serving node of the IAB node.

17. The IAB node according to claim 16, wherein the processor is further configured to:

before switching to the second IAB node, measure quality of at least one of a reference signal (RS) or a synchronization signal (SS) of the second IAB node; and the IAB node further comprises a transmitter, configured to report the quality of at least one of the reference signal or the synchronization signal of the second IAB node to the third IAB node.

18. The IAB node according to claim 15, wherein the processor is configured to:

switch to the second IAB node when determining that a condition for switching to the second IAB node is satisfied.

19. The IAB node according to claim 18, wherein the condition for switching to the second IAB node comprises at least one of:

a measurement result of a synchronization signal (SS) of the third IAB node is less than a preset threshold;

a measurement result of a channel state information-reference signal (CSI-RS) of the third IAB node is less than a preset threshold;

a measurement result of a tracking reference signal (TRS) of the third IAB node is less than a preset threshold;

a measurement result of a demodulation reference signal (DMRS) of the third IAB node is less than a preset threshold;

data volume buffered in the IAB node is greater than a preset threshold;

the IAB node detects a beam failure;

a quantity of beam failures detected by the IAB node in a unit time is greater than a preset threshold; or the IAB node does not receive a downlink signal from the third IAB node within a preset time.

20. The IAB node according to claim 15, wherein the first BWP configuration comprises at least one of the following: a BWP identifier, a subcarrier spacing, cyclic prefix (CP) indication information, a bandwidth value, a frequency domain position of a start resource block, synchronization signal (SS)/physical broadcast channel (PBCH) configuration information, CSI-RS configuration information, or random access channel (RACH) information.

* * * * *

UNITED STATES PATENT AND TRADEMARK OFFICE
CERTIFICATE OF CORRECTION

| | | |
|---|---|---|
| PATENT NO. | : 11,671,883 B2 | Page 1 of 1 |
| APPLICATION NO. | : 17/134874 | |
| DATED | : June 6, 2023 | |
| INVENTOR(S) | : Shitong Yuan et al. | |

It is certified that error appears in the above-identified patent and that said Letters Patent is hereby corrected as shown below:

In the Claims

In Claim 10, Column 26, Line 21, delete "CST-RS" and insert --CSI-RS--.

In Claim 15, Column 26, Line 62, delete "backhaul/IAB)" and insert --backhaul (IAB)--.

Signed and Sealed this
Twenty-ninth Day of August, 2023

Katherine Kelly Vidal
*Director of the United States Patent and Trademark Office*